L. ROBINSON.
Corn Planter.
No. 20,301.  Patented May 18, 1858.
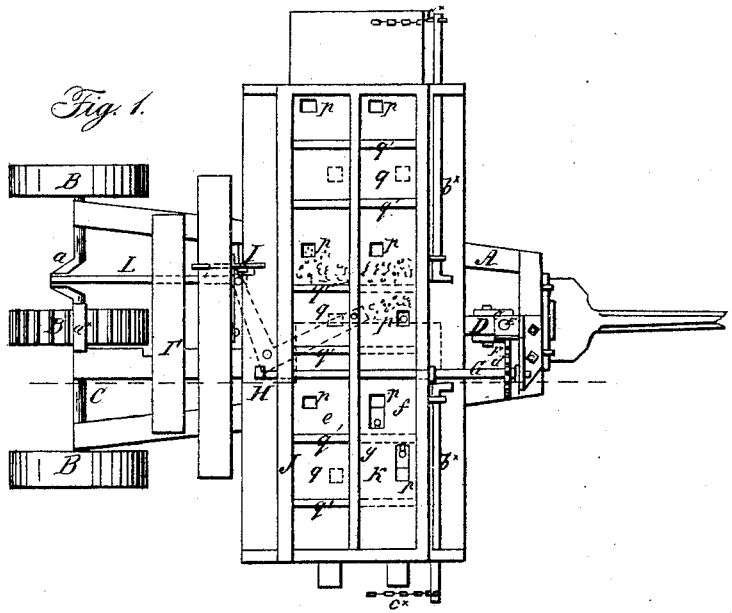
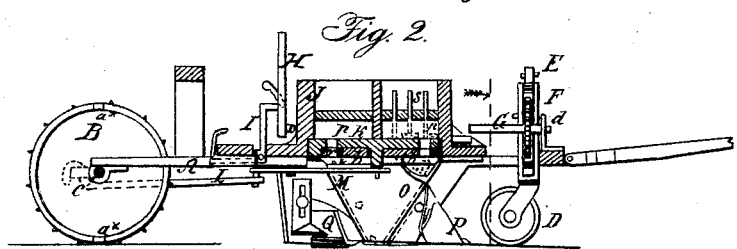
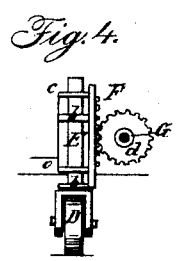
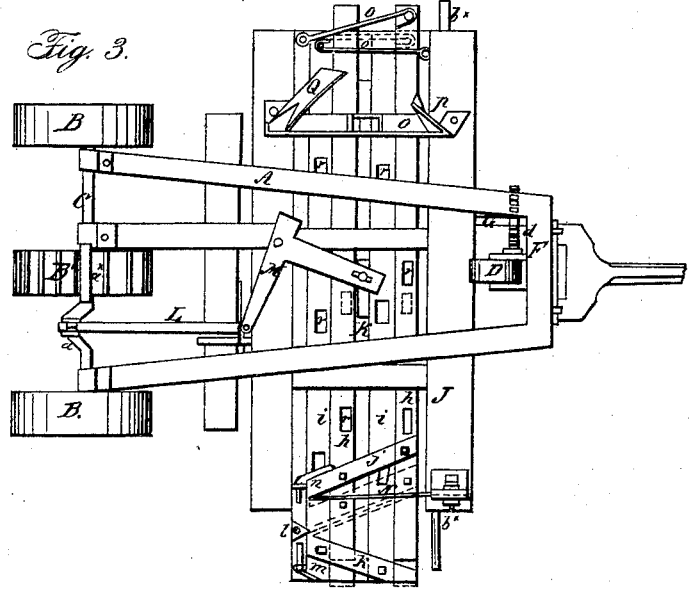

UNITED STATES PATENT OFFICE.

L. ROBINSON, OF MELROSE, MASSACHUSETTS.

IMPROVEMENT IN SEEDING-MACHINES.

Specification forming part of Letters Patent No. 20,301, dated May 18, 1858.

*To all whom it may concern:*

Be it known that I, LUTHER ROBINSON, of Melrose, in the county of Middlesex and State of Massachusetts, have invented a new and Improved Seeding-Machine; and I do hereby declare that the following is a full, clear, and exact description of the same, reference being had to the annexed drawings, making a part of this specification, in which—

Figure 1 is a plan or top view of my improvement. Fig. 2 is a longitudinal vertical section of the same, taken in the line $x\,x$, Fig. 1. Fig. 3 is an inverted plan of the same. Fig. 4 is a detached view of the mechanism by which the conveying-tubes and shares may be elevated when desired.

Similar letters of reference indicate corresponding parts in the several figures.

This invention consists in a novel means employed for distributing the seed.

The invention is chiefly designed for planting seed in hills and in check-rows, and at the same time to distribute, at the time of planting, a fertilizing material in the hills with the seed, the whole being so arranged as to insure the perfect distribution of the seed and fertilizing material, and to place the machine under the complete control of the attendant or driver.

To enable those skilled in the art to fully understand and construct my invention, I will proceed to describe it.

A represents a horizontal frame, the back end of which is supported by three wheels, B B B', said wheels being on one axle, C, which has a crank, $a$, formed on it near the central wheel, B'. The wheels B B are placed loosely on the axle C; but the central one, B', is rigidly attached to it. The front end of frame A is supported by a caster-wheel, D, the shaft E of which is fitted in guides attached to a vertical rack-bar, F. The shaft E also passes through guides $c\,c$, attached to the front end of the frame A.

G is a shaft, which is placed longitudinally on the frame A. The front end of this shaft has a pinion, $d$, on it, said pinion gearing into the rack F. The back end of the shaft G has a lever, H, attached to it.

I is a catch by which the outer end of lever H may be kept down when necessary. This catch is attached to the frame A, and may be constructed and arranged in any proper way.

I' is the driver's seat, which is placed on the back part of the frame A.

J is a box or hopper, which is placed transversely on the frame A. This box is of oblong quadrilateral form, and is divided into two compartments, $e\,f$, by a partition, $g$.

K is the bottom of the hopper, which is a slide so arranged as to be allowed to work freely back and forth. This slide has a reciprocating movement given it from the axle C by means of the crank $a$ on said axle, a rod, L, connected therewith, and a bent lever, M. (See more particularly Fig. 3.)

To the under side of the slide K four supplementary slides, $h\,h\,i\,i$, are placed. These slides are connected so as to form pairs, the slides $h\,h$ being connected by an oblique bar, $j$, near one end of them. The other pair, $i\,i$, are connected by an oblique bar, $k$, the two bars $j\,k$ being placed in opposite positions, as shown clearly in Fig. 3. Each pair of slides $h\,h$, $i\,i$ are allowed a certain play or movement, the length of which is determined by stops $l\,m\,n$, attached to the under side of slide K, the stop $l$ being between the converging ends of the bars $j\,k$ and the stops $m\,n$ at the outer sides of the ends of said bars. (See Fig. 3.) The converging ends of the bars $j\,k$ have a tendency to be, and are, when not otherwise acted upon, in contact with the stop $l$, in consequence of the slides $h\,h\,i\,i$ being acted upon by springs $o\,o$.

N is a spring, one end of which is attached to the under side of the box J. This spring extends across the slide K between the two oblique bars $j\,k$, as shown clearly in Fig. 3. The slide K has holes $p$ made through it at such points that a certain number will be directly over conveying-tubes O, which convey the seed to the earth at the end of each stroke or movement of the slide, the seed being distributed at these points. The box J has guards or plates $q$ fitted in it, which cover the holes $p$ when they are over the conveying-tubes O. The slides $h\,h$, $i\,i$ also have holes $r$ made in them, which are made to register with the holes $p$ in the slide K when said holes reach the point over the tubes O. The slides $h\,h\,i\,i$ are actuated at the proper time by the spring N, which is bent by the stop $l$ as the slide K moves. Two pairs of slides, $h\,h$, $i\,i$, are used, and the box J is divided into two compartments in order that seed and a fertilizing material—such as lime, guano, bone-dust, and similar fine substances—may be sown or planted simultaneously with the seed. The seed or seed and fertilizing material fill the holes in the slide K, and when drawn underneath the guards $q$ the seed or seed and fertilizing material will be liberated from the holes $p$ in slide K, in consequence of the holes $r$ in the slides $h\ h\ i\ i$ being thrown in register with the holes $p$ as said holes reach the points specified.

The guards $q$ may be formed of plates having india-rubber or other suitable substance, $q'$, attached to their sides, the india-rubber bearing on the slide K. Vertical pins $s$ may be attached to the slide K to agitate the seed and fertilizing material and prevent the same from packing or clogging in the box.

The conveying-tubes O may be constructed in the usual or in any proper way, and each tube has a furrow-share, P, in advance of it and a covering-share, Q, directly behind it.

The slide K is operated, as the machine is drawn along, by the rotation of the wheel B', and on the periphery of this wheel B' two projecting bars, $a^\times\ a^\times$, are attached at opposite points. By means of these bars the machine may be so rotated at the commencement of each row that the seed may be planted in check-rows. Toward the front end of the frame A two bars, $b^\times\ b^\times$, are attached, and a drag-chain, $c^\times$, is attached to the outer end of each bar $b^\times$.

The bars $b^\times\ b^\times$ are adjustable, and a chain at one side of the machine is intended to drag over the row previously planted, so that the attendant or driver may keep the rows perfectly parallel with each other.

By having the slides $h\ h\ i\ i$ operated by the spring, as shown, the dropping of the seed is made quite instantaneous, so that the seed will drop compactly, or within the limits of what may be termed the "hill," and will not be scattered, as is often the case with the ordinary planters, rendering the after-culture quite troublesome in consequence of a difficulty in plowing.

The driver may elevate the conveying-tubes and shares free from the ground by turning down the lever H, the pinion $d$ elevating the machine in consequence of its gearing into the rack F.

Having thus described my invention, what I claim as new, and desire to secure by Letters Patent, is—

The perforated reciprocating slide K, in combination with the supplementary or auxiliary perforated slides $h\ h\ i\ i$, one or more pairs, operated substantially as shown, for the purpose set forth.

LUTHER ROBINSON.

Witnesses:
CHAS. M. CUMSTON,
LUTHER W. ANDERSON.